United States Patent
Deylitz

(10) Patent No.: US 7,067,746 B2
(45) Date of Patent: Jun. 27, 2006

(54) TRAVELLING MECHANISM FOR A WITHDRAWABLE CIRCUIT-BREAKER

(75) Inventor: Erhard Deylitz, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 280 days.

(21) Appl. No.: 10/475,604

(22) PCT Filed: Mar. 26, 2002

(86) PCT No.: PCT/DE02/01155

§ 371 (c)(1),
(2), (4) Date: Oct. 22, 2003

(87) PCT Pub. No.: WO02/087039

PCT Pub. Date: Oct. 31, 2002

(65) Prior Publication Data

US 2004/0129546 A1   Jul. 8, 2004

(30) Foreign Application Priority Data

Apr. 23, 2001 (DE) .......................... 101 20 784

(51) Int. Cl.
*H01H 9/20* (2006.01)

(52) U.S. Cl. ................ 200/50.01; 200/50.21
(58) Field of Classification Search ........... 200/50.01, 200/50.17, 50.21, 50.23–50.27; 361/605–610, 361/615

See application file for complete search history.

(56) References Cited

U.S. PATENT DOCUMENTS

| | | | | |
|---|---|---|---|---|
| 3,213,224 A | * | 10/1965 | Mrenna et al. | 200/50.15 |
| 3,219,771 A | * | 11/1965 | Umphrey | 200/50.25 |
| 3,790,861 A | * | 2/1974 | Sakats | 361/609 |
| 4,139,748 A | | 2/1979 | Wolfe et al. | |
| 4,262,175 A | | 4/1981 | Rexroad et al. | |
| 5,097,382 A | | 3/1992 | Leach et al. | |
| 5,200,585 A | | 4/1993 | Davies et al. | |
| 5,278,722 A | * | 1/1994 | Peruso | 361/606 |
| 5,337,210 A | * | 8/1994 | Ishikawa et al. | 361/608 |
| 5,466,902 A | * | 11/1995 | Blom et al. | 200/50.21 |
| 5,912,444 A | * | 6/1999 | Godesa | 200/50.01 |
| 6,005,208 A | * | 12/1999 | Castonguay | 200/308 |
| 6,066,814 A | * | 5/2000 | Smith et al. | 200/50.24 |
| 6,838,626 B1 | * | 1/2005 | Deylitz et al. | 200/50.21 |

FOREIGN PATENT DOCUMENTS

| | | |
|---|---|---|
| DE | 4420580 | 6/1994 |
| DE | 4420581 | 6/1994 |
| DE | 4420584 | 6/1994 |

* cited by examiner

*Primary Examiner*—Lisa N. Klaus
(74) *Attorney, Agent, or Firm*—Harness, Dickey & Pierce, P.L.C.

(57) ABSTRACT

A travelling mechanism for a withdrawable circuit-breaker includes a crank handle that is secured in a manner that prevents it from being removed. A shaft of the crank handle revolves around an input shaft and is guided in a manner that permits it to be displaced in relation thereto. An accommodating recess holds the crank handle in its inoperative position. In its working position, the crank handle can only be pulled out when a locking lever that is dependent on the switching position of the circuit-breaker releases a locking slot on the shaft of the crank handle. In the working position, the crank handle is secured by a locking slide. An indicating device for indicating the position of the circuit-breaker comprises a two-armed indicating lever, which is provided with a window opening that permits the entry of a tongue of the locking slide in the test position.

27 Claims, 2 Drawing Sheets

TRAVELLING MECHANISM FOR A WITHDRAWABLE CIRCUIT-BREAKER

This application is the national phase under 35 U.S.C. § 371 of PCT International Application No. PCT/DE02/01155 which has an International filing date of Mar. 26, 2002, which designated the United States of America and which claims priority on German Patent Application number DE 101 20 784.0 filed Apr. 23, 2001, the entire contents of which are hereby incorporated herein by reference.

FIELD OF THE INVENTION

The invention generally relates to a traveling mechanism. Preferably, it relates to one for a withdrawable circuit-breaker with a drive shaft, to be actuated by a crank handle, and a gear mechanism for transforming a rotation of the drive shaft into a rotation of a traveling shaft arranged at right angles to the latter. Preferably, it also relates to a mechanism with an indicating device for the position of the circuit-breaker in relation to main and auxiliary isolating contacts.

BACKGROUND OF THE INVENTION

A traveling mechanism of this type is disclosed for example by DE 44 20 584 C1. The drive shaft is in this case provided with a profiled head piece, onto which the crank handle can be fitted in order to make the circuit-breaker travel into or out of an associated withdrawable rack.

The operational necessity for this action may occur surprisingly. Therefore, it is necessary to keep the crank handle ready in such a way that it is available when needed without any loss of time. Experience with the operation of electrical installations has shown, however, that nevertheless a required crank handle occasionally cannot be found or is not available. The reason for this may be, for example, in a relatively large switching station that crank handles were not procured for all the circuit-breakers present, or some of them have gone missing and the remaining crank handles are being used for servicing work required at the same time.

SUMMARY OF THE INVENTION

On this basis, it is an object of an embodiment of the invention to ensure that the traveling mechanism of a circuit-breaker is operational at any time.

According to an embodiment of the invention, an object may be achieved by the crank handle having a hollow shaft, which reaches around the drive shaft and is displaceable in relation to the drive shaft. It is preferably also secured in a manner that prevents it from being removed from the drive shaft. Further, a grip of the crank handle is preferably guided displaceably approximately parallel to the shaft on a crank arm connected to the shaft.

This arrangement makes the crank handle become an integral part of the traveling mechanism and consequently unable to go missing. It is found in this respect that the benefit of the definite availability of the crank handles far outweighs the possible saving from a reduced number of crank handles.

It is already known (U.S. Pat. No. 1,139,748) to provide a circuit-breaker with a retractable handle for making it move in and out. This handle acts by a repeated forward and backward movement by use of a ratchet mechanism on a drive shaft, which is consequently rotatable, not continuously but in steps. When not in use, the handle is pushed into a position right up against the front of the operator control panel of the circuit-breaker, to allow the door of the switch-gear cell to be closed. In this arrangement, the handle has no grip and therefore does not permit continuous rotation of the drive shaft in a way corresponding to the arrangement according to DE 44 20 580 C1, on which an embodiment of the invention is based.

It is important for the user of the traveling mechanism that he can use the crank handle without the risk of contact with other parts of the circuit-breaker or of the switchgear cell accommodating the circuit-breaker. This can be achieved by the shaft of the crank handle having a radially protruding guiding pin for engaging in a guiding slot of a housing accommodating the drive shaft and the gear mechanism and by the length of the guiding slot being dimensioned to correspond to a displacement of the shaft from a pushed-in inoperative position into a pulled-out working position, in which the guiding slot is adjoined by an annular slot which allows free rotation of the crank handle. This ensures that the crank handle cannot be turned until the shaft has been fully pulled out of its inoperative position and has reached the working position.

For accommodating the crank arm in its inoperative position, there may be provided an accommodating recess, which has a through-opening for the grip which is displaceable in the crank arm. The shaft, the crank arm and the grip are able to be lowered completely in the accommodating recess. This avoids the crank handle protruding beyond the outline of the circuit-breaker when it is in its inoperative position. The accommodating recess consequently allows the crank handle to be integrated into the operator control panel or operator console of the circuit-breaker, which is advantageous for the user.

To facilitate proper use of the traveling mechanism, it is recommendable that a locking slide is guided in the housing in a manner that permits it to be displaced transversely in relation to the shaft and is biased against the shaft by a biasing spring; and that the shaft has a locking face interacting with the locking slide for securing the position of the shaft pulled out into its working position. For returning the crank handle into its inoperative position, it may be provided in this connection that the locking slide is provided with an actuating lug for a return movement of the locking slide to be performed manually against the force of the biasing spring; and that the actuating lug is arranged such that it can be covered by the crank arm during pushing into the inoperative position. As is still to be explained, the movement of the locking slide is used for at least one further important function.

For accommodating the crank arm in its inoperative position, there may be provided an accommodating recess, which has a through-opening for the grip which is displaceable in the crank arm. The shaft, the crank arm and the grip are able to be lowered completely in the accommodating recess. Such an accommodating recess ensures that the crank arm does not protrude beyond the operator control panel or the operator console of the circuit-breaker and, in addition, attempted incorrect use is prevented.

Although the accommodating recess may be shaped in such a way that there is at least locally the possibility of engaging behind the crank arm in order to bring it into its working position, it is recommendable to choose a shape of the accommodating recess that is adapted to the contour of the crank arm with the associated shaft. The desired operability of the crank arm can be made possible nevertheless by the depth of the accommodating recess being increased with respect to an amount required for completely accommodating the crank arm of the crank handle and by the shaft with the attached crank arm being able to be pressed in against the force of a stop spring beyond a position flush with the front of the accommodating recess, the grip bearing in the flush position against a stop. Further, when the shaft is pressed in against the force of the stop spring, it is able to be pressed out of the crank arm by the distance covered by the shaft. In this way, the grip is pressed out from the crank arm by such an amount that it can subsequently be pulled out fully, the crank arm and the attached shaft finally being taken along at the same time.

The stop spring acting on the shaft with the attached crank arm may expediently be formed as a helical compression spring, which is arranged on the circumference of the drive shaft between an end face of the shaft and a supporting ring seated on the drive shaft. The central arrangement of the spring has the effect of preventing any risk of canting, and consequently unsatisfactory functioning.

It is among the known safety measures that a circuit-breaker must not be made to travel when its switching contacts are closed ("ON" switching position). Arrangements suitable for this which have a crank handle which can be fitted onto the drive shaft are known in connection with traveling mechanisms. With these, a suitable closure device ensures that an insert opening arranged ahead of the head piece of the drive shaft is closed in dependence on the switching position.

The same protective effect can be achieved in the case of a traveling mechanism according to an embodiment of the invention by a blocking slot being arranged in the shaft of the crank handle and a blocking lever with a blocking lug serving for engagement in the blocking slot being arranged in the housing. The position of the blocking lever is controlled by the switching position of the circuit-breaker in such a way that, in the "ON" switching position, the blocking lug enters the blocking slot.

The indicating device mentioned at the beginning is provided in order that the user of the traveling mechanism can recognize the position of the circuit-breaker and not be dependent on a visual appraisal of the respective position of the circuit-breaker. For this purpose, the indicating device can include an indicating window for an indicating device, arranged adjoining the end of the accommodating recess that accommodates the shaft for example. The user can then observe the crank handle and the indicating window without changing the viewing direction.

Although the component actually determining the position of the circuit-breaker is the traveling shaft and the latter is not in the direct vicinity of the crank handle, a reliable indication can be achieved in a surprisingly simple way by the indicating device having a two-armed indicating lever which is pivotably mounted on the housing of the traveling mechanism. The one lever arm interacts with a control cam coupled to the traveling shaft and the other lever arm bears an indicating device which can be perceived in the indicating window. The two-armed form of the indicating lever in combination with the control cam contributes to bring about an approximately step-changing indication, as further explained later on the basis of the exemplary embodiment. For this, it proves to be expedient to arrange the control cam on the end face of a gear wheel seated on the traveling shaft.

It is likewise among the known safety measures that the use of the traveling mechanism can be prevented by a locking device, for example to protect servicing personnel. In the case of known traveling mechanisms, for instance according to DE 44 20 581 C1, for this purpose a closure element of the access opening to the drive shaft can be secured by a padlock. Within this scope of an embodiment of the invention, the same result can be achieved by the crank arm having a through-opening for a bolt piece for blocking the crank handle in the pushed-in state. Advantageous in this respect is the much greater dimension of the crank arm in comparison with said closure element, which allows the use of larger locks and if need be also the use of more than one lock. Consequently, a number of persons can secure the location in which they are working when they are carrying out servicing work at various locations of a relatively large technical installation.

As already mentioned, the locking slide may be given at least one additional function. For this purpose, a tongue extending in the direction of the indicating lever may be arranged on the locking slide, the indicating lever being provided with a window opening for the tongue of the locking slide to enter in the test position of the circuit-breaker. This achieves the effect that the crank handle can be pushed back into its inoperative position only when the test position has been precisely reached. If the test position has not been precisely reached, the tongue of the locking slide strikes against the indicating lever, so that the locking slide cannot be displaced in order to release the shaft of the crank handle.

BRIEF DESCRIPTION OF THE DRAWINGS

The present invention will become more fully understood from the detailed description of preferred embodiments given hereinbelow and the accompanying drawings, which are given by way of illustration only and thus are not limitative of the present invention, and wherein.

DETAILED DESCRIPTION OF THE PREFERRED EMBODIMENTS

Figure 1:
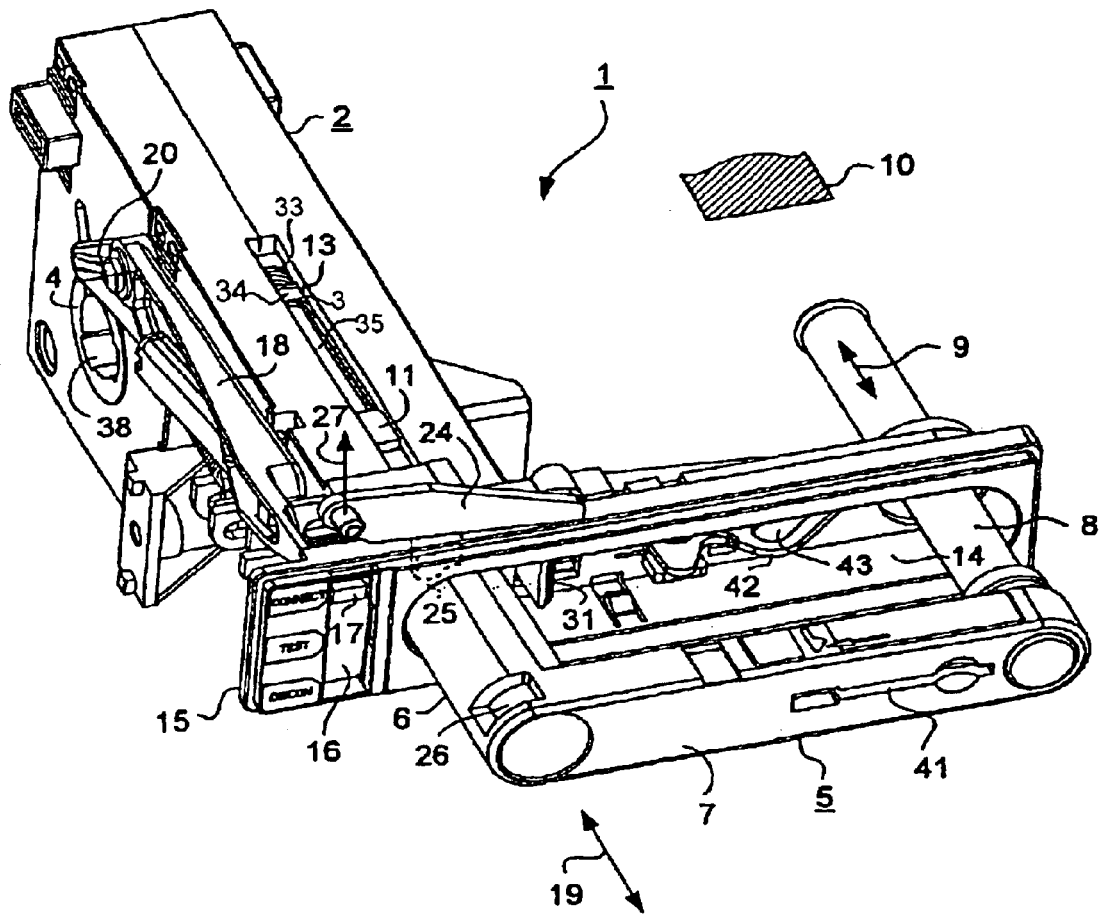
FIG. 1 shows a traveling mechanism as an assembly which can be fitted on a low-voltage circuit-breaker.
Figure 2:
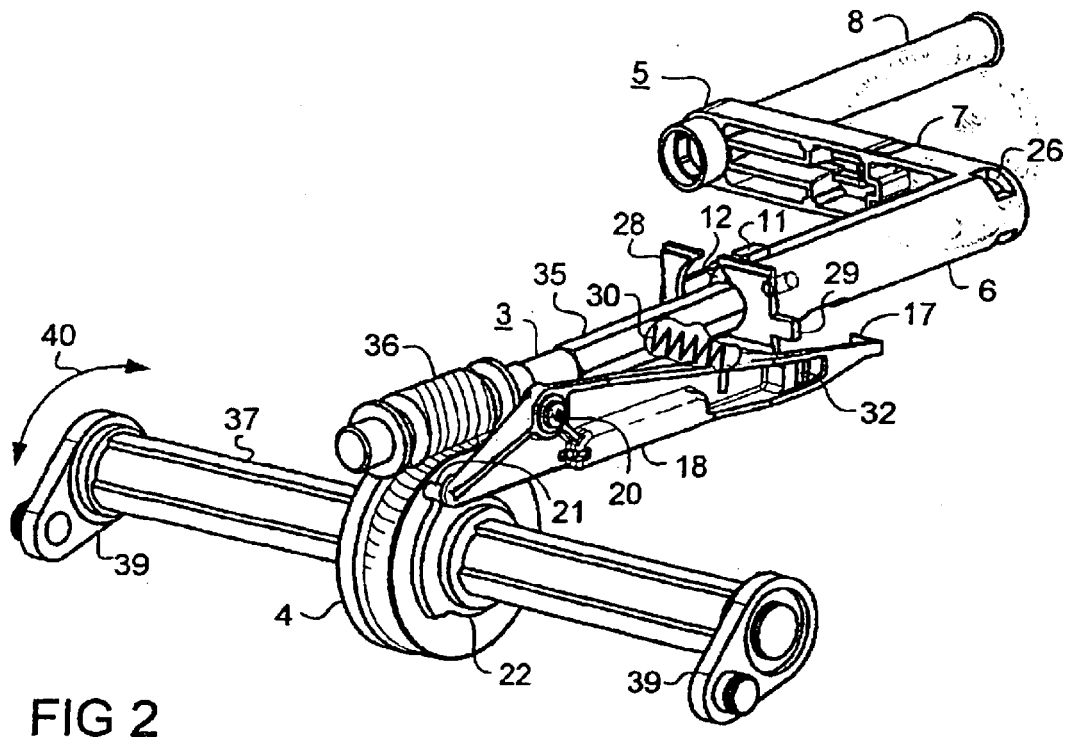
FIG. 2 shows essential parts of the traveling mechanism according to FIG. 1, but without a housing and without an accommodating recess for a crank handle, a traveling shaft being located in the isolating position of the associated circuit-breaker.
Figure 3:
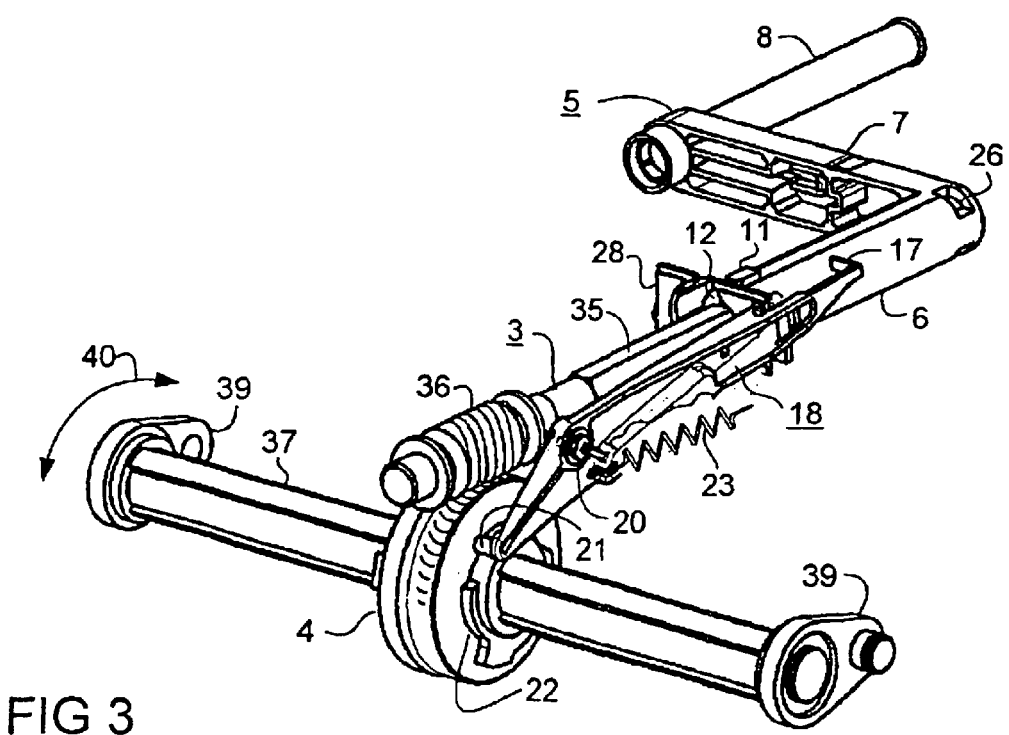
FIG. 3 shows a representation corresponding to FIG. 2 of essential parts of the traveling mechanism, but in the test position of the associated circuit-breaker.

The traveling mechanism 1 according to FIG. 1 has a housing 2, which may be expediently made up of two shell-like halves, between which parts of the gear mechanism and further components are arranged. A turning movement exerted by way of a crank handle 5 is transformed by means of a drive shaft 3 (cf. also FIGS. 2 and 3) into a rotation of a traveling shaft 37 (FIGS. 2 and 3). Arranged for this purpose on the drive shaft 3 is a worm 36, which is in engagement with a gear wheel 4. The longitudinal axes of the drive shaft 3 and of the traveling shaft 37 are at right angles to each other.

The traveling shaft 37 is not fixedly connected to the traveling mechanism 1, but is displaceable in a profiled opening 38 of the gear wheel 4, which is adapted to the profile of the traveling shaft 37. In this way, the traveling mechanism 1 can be used for circuit-breakers of different sizes and is not restricted to a specific position along the traveling shaft 37. Attached to the ends of the traveling shaft 37 in a known way are traveling cranks 39, which interact with fixed parts approximately in the way schematically shown in DE 44 20 58 C1 or DE 44 20 581 C1 (FIG. 1 in each case). Likewise not represented is the fastening of the traveling mechanism 1 on a circuit-breaker, since a person skilled in the art is familiar with this.

Serving for turning the drive shaft 3 mounted in the housing 2, as already mentioned, is a crank handle 5. As a difference from other known traveling mechanisms (cf. the cited DE 44 20 58 C1 and DE 44 20 581 C1), the crank handle 5 cannot be removed but is a component part of the traveling mechanism 1. The crank handle 5 has a hollow shaft 6, which reaches around a hexagonal shaft 35 of the drive shaft 3 (FIGS. 2 and 3) and is displaceable on the drive shaft 3 along the direction of an arrow 19 (FIG. 1). Obviously, the drive shaft 3 and the shaft 6 may also have different profiles in order to establish a rotationally locked coupling which permits a longitudinal displacement.

The shaft 6 bears a guiding pin 11, which engages in a guiding slot 13 provided on the housing 2. Since the guiding slot 13 is adapted to the guiding pin 11, the shaft 6 can be displaced along the guiding slot 13, but without the possibility of rotation. This is only made possible when the shaft 6 has been pulled fully forward, where, in the housing 2, the guiding slot 13 opens into an annular slot. In this connection, "annular slot" is also to be understood as meaning differently shaped recesses of the housing 2 that permit free rotation of the shaft 6.

The crank handle 5 includes not only the shaft 6 but also a crank arm 7 which is connected to the shaft 6 (or is produced in one piece with it) and on the end of which there is an opening for accommodating a grip 8. The grip 8 is displaceable in the said opening parallel to the shaft 6 in the direction of an arrow 9 and can be transferred by the user out of the pushed-in inoperative position according to FIG. 1 into a pulled-out working position, which is shown in the FIGS. 2 and 3.

In the normal or inoperative position, the crank handle 5 can be accommodated in a manner in which it is lowered flush in an accommodating recess 14. The accommodating recess 14 belongs to an operator console insert 15 (FIG. 1), which may preferably be arranged on the lower edge of an operator console of a circuit-breaker, as schematically shown in a similar way in the mentioned DE 44 20 580 C1 or DE 44 20 581 C1. When the crank handle 5 is pushed into its inoperative position, an end face 12 at the end of the shaft 6 comes to bear against a supporting ring 34, which is loaded by a stop spring 33. The stop spring 33 is a helical compression spring which is seated on the drive shaft 3. Subsequently, the user pushes the grip 8 through the opening located in the crank arm 7 into the position in which it is flush with the crank arm 7. The inner end of the grip 8 then bears against a stop 10.

In this pushed-in inoperative position, the user has in fact no possible way of grasping the crank arm, because the contour of the accommodating recess 14 is adapted to the crank arm 7 with the shaft 6 and grip 8. Nevertheless, rapid access is ensured when needed. This takes place by virtue of the depth of the accommodating recess being dimensioned such that it is larger by a certain amount than is required for accommodating the parts mentioned. The user can therefore press the crank arm 7 somewhat into the accommodating recess against the force of the stop spring 33. The grip 8 cannot participate in this movement, however, because it is bearing against the fixed stop 10, and is then protruding by the same amount out of the crank arm 7. The user can then pull out the grip 8 and subsequently the crank arm 7 with the shaft 6.

In a way similar to in the case of known traveling mechanisms, arranged next to the crank handle 5 is an indicating window 16, in which an indicating device 17 for the operational position of the circuit-breaker in its withdrawable rack is visible. As is known, these positions— operating position, test position and isolating position— relate to the relative position of movable main isolating contacts and auxiliary isolating contacts and consequently, with a given arrangement of these isolating contacts, to the position of the circuit-breaker in the associated withdrawable rack. On account of the engagement of the traveling cranks 39 at the ends of the traveling shaft 37 in a fixed guide, the angular position of the gear wheel 4 consequently constitutes a reliable feature for the said positions.

For the purposes of the indicating device, arranged on an end face of the gear wheel 4 is a control cam 22, against which a sensing pin 21 of a two-armed indicating lever 18 bears under the action of a tension spring 23 (FIG. 3). The indicating lever 18, pivotable about a bearing screw 20, consequently transfers the control cam 22 into a position of the indicating device 17 which can be perceived by the user in the indicating window 16. In this respect it is essential that, when actuating the crank handle 5, the user can easily recognize when the positions mentioned are reached.

For this purpose, the control cam 22 is provided with portions of different slopes, which are shaped in such a way that, shortly after leaving one of the positions mentioned, the indicating device in each case assumes an intermediate position. Then, only shortly before the following position is reached, it points to it. As a result of the bearing screw 20 of the indicating lever 18 being placed relatively close to the control cam 22, relatively small deflections are transformed into easily visible movements of the indicating device 17 in the indicating window 16.

The shaft 6 is protected against being pushed unintentionally into the housing 2 by a locking slide 28, which is loaded by a biasing spring 30 (FIG. 2). The locking slide 28 is guided in the front part of the housing 2 and at the same time interacts with the end face 12 at the inner end of the shaft 6. When the shaft 6 is pulled out into its working position, the locking slide 28 springs with one of its two edges facing the drive shaft 3 behind the end face 12 and consequently blocks the pushing-in of the shaft 6. In order to release the shaft 6 for pushing in, available to the user is an actuating lug 31, which is arranged in such a way that it protrudes into the accommodating recess 14 and is therefore accessible only when the crank handle 5 is pulled out.

The locking slide 28 has an additional function in the central position (test position) of the traveling mechanism 1. As a difference from the operating position and isolating position, this position is not conveyed to the user by a resistance that can be felt at the crank handle when end stops are reached. In order that the user can nevertheless only push the crank handle 5 in when the test position has been precisely reached, the locking slide 28 is provided with a tongue 29, which emerges from the side of the housing 2 when the actuating lug 31 is operated and a window opening arranged in the indicating lever 18 is opposite the tongue 29.

The known traveling mechanisms already have a device which prevents actuation when the circuit-breaker is switched on (DE 44 20 580 C1). For this purpose, access to the drive shaft is blocked by a protective element.

In the case of the traveling mechanism according to an embodiment of the invention, the user is additionally also barred access to the crank handle 5. This takes place by a blocking lever 24 in combination with a blocking slot 26 arranged in the shaft 6 of the crank handle. The blocking lever is in this case appropriately in connection with a blocking rod, as is described in DE 44 20 580 C1. If the preconditions that allow the traveling mechanism 1 to be safely actuated are satisfied, the blocking lever 24 is raised in a manner corresponding to an arrow 27 shown in FIG. 1, a blocking lug 25 being pulled out of the blocking slot 26 of the shaft 6. Conversely, the switching-on of the circuit-breaker is only possible when the crank handle 5 has been pushed back into its inoperative position in the accommodating recess 14, and consequently the blocking lug 25 on the blocking lever 24 can again enter the blocking slot 26.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A traveling mechanism for a withdrawable circuit-breaker, comprising:
   a crank handle, adapted to actuate a drive shaft;
   a gear mechanism for transforming a rotation of the drive shaft into a rotation of a traveling shaft, arranged at right angles to the drive shaft; and
   an indicating device, adapted to indicate the position of the circuit-breaker in relation to at least one of main and auxiliary isolating contacts, wherein the crank handle includes a hollow shaft reaching around the drive shaft and is displaceable in relation to the drive shaft, the crank handle further being secured in a manner that prevents it from being removed from the drive shaft, and wherein a grip of the crank handle is guided displaceably approximately parallel to the hollow shaft on a crank arm connected to the hollow shaft.

2. The traveling mechanism as claimed in claim 1, wherein the hollow shaft of the crank handle includes a radially protruding guiding pin for engaging in a guiding slot of a housing accommodating the drive shaft and the gear mechanism, and wherein a length of the guiding slot is dimensioned to correspond to a displacement of the hollow shaft from a pushed-in inoperative position into a pulled-out working position, in which the guiding slot is adjoined by an annular slot which allows free rotation of the crank handle.

3. The traveling mechanism as claimed in claim 2, wherein a locking slide is guided in the housing, such that it is adapted to be displaced transversely in relation to the hollow shaft and is biased against the hollow shaft by a biasing spring and wherein the hollow shaft includes a locking face, adapted to interact with the locking slide to secure the position of the hollow shaft when pulled out into its working position.

4. The traveling mechanism as claimed in claim 3, wherein the locking slide includes an actuating lug for a return movement of the locking slide to be performed manually against the force of the biasing spring and wherein the actuating lug is arranged such that it is adapted to be covered by the crank arm during pushing into the inoperative position.

5. The traveling mechanism as claimed in claim 2, wherein the indicating device includes an indicating window for an indicating device, arranged adjoining the end of the accommodating recess that accommodates the hollow shaft.

6. The traveling mechanism as claimed in claim 5, wherein the indicating device includes has a two-armed indicating lever, pivotably mounted on the housing of the traveling mechanism, wherein one lever arm is adapted to interact with a control cam coupled to the traveling shaft and the other lever arm is adapted to bear the indicating device, wherein the indicating device is adapted to be perceived in the indicating window.

7. The traveling mechanism as claimed in claim 1, further comprising:
   an accommodating recess, adapted to accommodate the crank arm of the crank handle in its inoperative position, the accommodating recess including a through-opening for the grip, displaceable in the crank arm, wherein the hollow shaft, the crank arm and the grip are completely lowerable in the accommodating recess.

8. The traveling mechanism as claimed in claim 7, wherein a depth of the accommodating recess is increased with respect to an amount required for completely accommodating the crank arm of the crank handle and wherein the hollow shaft with the attached crank arm is adapted to be pressed in against the force of a stop spring, beyond a position flush with the front of the accommodating recess, the grip bearing in the flush position against a stop and, when the hollow shaft is pressed in against the force of the stop spring, being able to be pressed out of the crank arm by the distance covered by the hollow shaft.

9. The traveling mechanism as claimed in claim 8, wherein the stop spring, acting on the hollow shaft with the attached crank arm, is formed as a helical compression spring, arranged on the circumference of the drive shaft between an end face of the hollow shaft and a supporting ring seated on the drive shaft.

10. The traveling mechanism as claimed in claim 1, wherein a blocking slot is arranged in the hollow shaft of the crank handle and a blocking lever with a blocking lug, serving for engagement in the blocking slot, is arranged on the housing, the position of the blocking lever being controlled by the switching position of the circuit-breaker in such a way that, in the "ON" switching position, the blocking lug enters the blocking slot.

11. The traveling mechanism as claimed in claim 1, wherein the indicating device includes an indicating window for an indicating device, arranged adjoining the end of the accommodating recess that accommodates the hollow shaft.

12. The traveling mechanism as claimed in claim 11, wherein the indicating device includes has a two-armed indicating lever, pivotably mounted on a housing of the traveling mechanism, wherein one lever arm is adapted to interact with a control cam coupled to the traveling shaft and the other lever arm is adapted to bear the indicating device, wherein the indicating device is adapted to be perceived in the indicating window.

13. The traveling mechanism as claimed in claim 12, wherein the control cam is arranged on an end face of a gear wheel seated on the traveling shaft.

14. The traveling mechanism as claimed in claim 12, wherein the locking slide includes a tongue extending in the direction of the indicating lever and wherein the indicating lever includes a window opening for the tongue of the locking slide to enter in the test position of the circuit-breaker.

15. The traveling mechanism as claimed in claim 1, wherein the crank arm includes a through-opening for a bolt piece for blocking the crank handle in the pushed-in state.

16. A mechanism for a circuit-breaker, comprising:
   a crank handle, adapted to actuate a drive shaft, the crank handle including, a hollow shaft surrounding the drive shaft, wherein the crank shaft is displaceable in relation to the drive shaft and is further secured in a manner that prevents it from being removed from the drive shaft, a crank arm connected to the hollow shaft, and a grip, the grip of the crank handle being adapted to be guided displaceably approximately parallel to the hollow shaft on the crank arm.

17. The mechanism of claim 16, further comprising:

a gear mechanism for transforming a rotation of the drive shaft into a rotation of a traveling shaft, arranged at right angles to the drive shaft; and an indicating device, adapted to indicate the position of the circuit-breaker in relation to at least one of main and auxiliary isolating contacts.

18. The mechanism as claimed in claim 17, wherein the hollow shaft of the crank handle includes a radially protruding guiding pin for engaging in a guiding slot of a housing accommodating the drive shaft and the gear mechanism, and wherein a length of the guiding slot is dimensioned to correspond to a displacement of the hollow shaft from a pushed-in inoperative position into a pulled-out working position, in which the guiding slot is adjoined by an annular slot which allows free rotation of the crank handle.

19. The mechanism as claimed in claim 18, wherein a locking slide is guided in the housing, such that it is adapted to be displaced transversely in relation to the hollow shaft and is biased against the hollow shaft by a biasing spring and wherein the hollow shaft includes a locking face, adapted to interact with the locking slide to secure the position of the hollow shaft when pulled out into its working position.

20. The mechanism as claimed in claim 19, wherein the locking slide includes an actuating lug for a return movement of the locking slide to be performed manually against the force of the biasing spring and wherein the actuating lug is arranged such that it is adapted to be covered by the crank arm during pushing into the inoperative position.

21. The mechanism as claimed in claim 17, further comprising:

an accommodating recess, adapted to accommodate the crank arm of the crank handle in its inoperative position, the accommodating recess including a through-opening for the grip, displaceable in the crank arm, wherein the hollow shaft, the crank arm and the grip are completely lowerable in the accommodating recess.

22. The mechanism as claimed in claim 21, wherein a depth of the accommodating recess is increased with respect to an amount required for completely accommodating the crank arm of the crank handle and wherein the hollow shaft with the attached crank arm is adapted to be pressed in against the force of a stop spring, beyond a position flush with the front of the accommodating recess, the grip bearing in the flush position against a stop and, when the hollow shaft is pressed in against the force of the stop spring, being able to be pressed out of the crank arm by the distance covered by the hollow shaft.

23. The mechanism as claimed in claim 22, wherein the stop spring, acting on the hollow shaft with the attached crank arm, is formed as a helical compression spring, arranged on the circumference of the drive shaft between an end face of the hollow shaft and a supporting ring seated on the drive shaft.

24. The mechanism as claimed in claim 17, wherein the indicating device includes an indicating window for an indicating device, arranged adjoining the end of the accommodating recess that accommodates the hollow shaft.

25. The mechanism as claimed in claim 24, wherein the indicating device includes has a two-armed indicating lever, pivotably mounted on a housing of the traveling mechanism, wherein one lever arm is adapted to interact with a control cam coupled to the traveling shaft and the other lever arm is adapted to bear the indicating device, wherein the indicating device is adapted to be perceived in the indicating window.

26. The mechanism of claim 16, wherein the circuit breaker is a withdrawable circuit breaker.

27. A withdrawable circuit breaker, comprising the mechanism of claim 16.

* * * * *